(12) United States Patent
Kim et al.

(10) Patent No.: US 11,205,391 B2
(45) Date of Patent: Dec. 21, 2021

(54) IMAGE AND AUDIO PROCESSING APPARATUS AND OPERATING METHOD OF THE SAME

(71) Applicant: SAMSUNG ELECTRONICS CO., LTD., Suwon-si (KR)

(72) Inventors: Sunmin Kim, Suwon-si (KR); Seokhwan Jo, Suwon-si (KR); Inwoo Hwang, Suwon-si (KR); Wooseok Kang, Suwon-si (KR); Daesung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/599,932

(22) Filed: Oct. 11, 2019

(65) Prior Publication Data

US 2020/0152138 A1   May 14, 2020

(30) Foreign Application Priority Data

Nov. 14, 2018   (KR) ........................ 10-2018-0140097

(51) Int. Cl.
  *G09G 3/34*   (2006.01)
  *A63F 13/35*   (2014.01)

(52) U.S. Cl.
  CPC ........... *G09G 3/3406* (2013.01); *A63F 13/35* (2014.09); *A63F 2300/552* (2013.01); *G09G 2360/144* (2013.01)

(58) Field of Classification Search
  CPC ........... G09G 3/3406; G09G 2360/144; G09G 2320/066; G09G 2320/0613; A63F 13/54
  See application file for complete search history.

(56) References Cited

U.S. PATENT DOCUMENTS 6,354,943 B1   3/2002   Miura
10,140,520 B2   11/2018   Katsavounidis
(Continued)

FOREIGN PATENT DOCUMENTS

JP   2000-135377 A   5/2000
JP   2009194550 A   8/2009
(Continued)

OTHER PUBLICATIONS

International Search Report and Written Opinion (PCT/ISA/210 &237) dated Jan. 22, 2020, issued by International Searching Authority in counterpart International Application No. PCT/KR2019/013593.

(Continued)

*Primary Examiner* — Samantha (Yuehan) Wang
(74) *Attorney, Agent, or Firm* — Sughrue Mion, PLLC

(57) ABSTRACT

Provided are an apparatus capable of dynamically controlling an image signal and an audio signal of content in units of content and an operating method of the apparatus. The apparatus includes a processor configured to detect characteristic information of an image signal of content based on analyzing the image signal in units of the content, detect characteristic information of an audio signal of the content based on analyzing the audio signal in the units of the content, and control the image signal in the units of the content based on the characteristic information of the image signal and the characteristic information of the audio signal to output the image signal, and control the audio signal in the units of the content based on the characteristic information of the image signal and the characteristic information of the audio signal to output the audio signal.

12 Claims, 7 Drawing Sheets

(56) References Cited

U.S. PATENT DOCUMENTS

| | | |
|---|---|---|
| 2011/0095875 A1 | 4/2011 | Thyssen et al. |
| 2014/0123195 A1 | 5/2014 | Han et al. |
| 2014/0132628 A1* | 5/2014 | Hoff, III ................. G06F 3/147 |
| | | 345/633 |
| 2017/0017844 A1* | 1/2017 | Jeong ................. H04N 21/4312 |
| 2017/0140226 A1 | 5/2017 | Tanaka et al. |
| 2017/0200430 A1 | 7/2017 | Lin |

FOREIGN PATENT DOCUMENTS

| | | |
|---|---|---|
| JP | 2015-2769 A | 1/2015 |
| KR | 10-2018-0020238 A | 2/2018 |

OTHER PUBLICATIONS

"Panasonic Owner's Manual for advanced features Digital Camera DMC-FZ1000", Panasonic, Jul. 21, 2014, XP055559483, Retrieved from the Internet: URL:ftp://ftp.panasonic.com/camera/om/dmc-fz1000_en_adv_om.pdf [retrieved on Feb. 20, 2019].

V. Verfaille et al., "Adaptive digital audio effects", In: "DAFX: Digital Audio Effects", Mar. 11, 2011, pp. 321-391, John Wiley & Sons, Ltd., Chichester, UK, XP055096267. (71 pages total).

Ying Li et al., "Content-Based Movie Analysis and Indexing Based on Audio Visual Cues", IEEE Transactions On Circuits and Systems for Video Technology, vol. 14, No. 8, Aug. 2004, pp. 1073-1085, XP001200076. (13 pages total).

Communication issued Aug. 20, 2021 by the European Patent Office in counterpart European Patent Application No. 19885176.8.

\* cited by examiner

IMAGE AND AUDIO PROCESSING APPARATUS AND OPERATING METHOD OF THE SAME

CROSS-REFERENCE TO RELATED APPLICATION

This application is based on and claims priority under 35 U.S.C. § 119 to Korean Patent Application No. 10-2018-0140097, filed on Nov. 14, 2018, in the Korean Intellectual Property Office, the disclosure of which is incorporated by reference herein in its entirety.

BACKGROUND

1. Field

The disclosure relates to an image and audio processing apparatus and an operating method of the same, and more particularly, to an image and audio processing apparatus capable of adaptively providing image quality and sound depending on content characteristics and an operating method of the image and audio processing apparatus.

2. Description of Related Art

An image and audio processing apparatus, such as a television (TV), may provide smart functions for users who want to enjoy various content.

However, users who want to enjoy content such as games need an image and audio processing apparatus that adaptively supports image quality and sound according to game content, in order to more actively enjoy the game. For example, in a case of a first person shooter (FPS) game, a user may need an image and audio processing apparatus capable of supporting a function of improving visibility and emphasizing a sound effect such as a minute footstep sound even though an image may be distorted, in order to quickly find a hidden enemy or game items hidden in a dark area. In case of a sports game, when a visibility is improved by distorting an image like in an FPS game, image quality rather degrades, and thus, a user may need an image and audio processing apparatus capable of providing a function of transferring sound intended by a manufacturer without distorting the image. As described above, conditions of image quality and sound desired by a user vary depending on game content because image quality and sound conditions that may maximize a user's immersion feeling vary based on the game content, i.e., vary based on the type of game content.

Therefore, an image and audio processing apparatus that may dynamically provide image quality and sound according to characteristics of content (e.g., game content) is in demand.

SUMMARY

Provided are an image and audio processing apparatus capable of providing image quality and sound that may maximize a user's immersion in content by dynamically controlling image signals and audio signals of the content by using a result of analyzing the image signal and the audio signal in units of content (e.g., units of scenes), and an operating method of the image and audio processing apparatus.

Further, provided are an image and audio processing apparatus capable of providing image quality and sound that may maximize a user's immersion in content by dynamically controlling image signals and audio signals of the content by using a result of analyzing the image signal and the audio signal in units of content (e.g., units of scenes) and peripheral environment information, and an operating method of the image and audio processing apparatus.

Additional aspects will be set forth in part in the description which follows and, in part, will be apparent from the description, or may be learned by practice of the embodiments of the disclosure.

In accordance with an aspect of the disclosure, there is provided an image and audio processing apparatus including: a display; an audio output interface; a memory storing one or more instructions; and a processor configured to execute the one or more instructions stored in the memory to: detect characteristic information of an image signal of content based on analyzing the image signal in units of the content, detect characteristic information of an audio signal of the content based on analyzing the audio signal in the units of the content, and control the image signal in the units of the content based on the characteristic information of the image signal and the characteristic information of the audio signal to output the image signal through the display, and control the audio signal in the units of the content based on the characteristic information of the image signal and the characteristic information of the audio signal to output the audio signal through the audio output interface.

The units of content may be units of scenes.

The processor may be further configured to execute the one or more instructions to: control at least one of a black equalizer function or a contrast and color saturation function with respect to the image signal in the units of the scenes, based on the characteristic information of the image signal and the characteristic information of the audio signal, and control at least one of an elevation perception generation and stage expansion function or a sound equalizer application function with respect to the audio signal in the units of the scenes, based on the characteristic information of the image signal and the characteristic information of the audio signal.

The characteristic information of the image signal may include at least one of brightness information, color information, contrast information, or motion information of the image signal, and the characteristic information of the audio signal may include at least one of location information of an audio object, voice information, music information, or sound effect information.

The image and audio processing apparatus may further include: an illuminance sensor configured to detect illuminance information with respect to outside of the image and audio processing apparatus, and the processor may be further configured to execute the one or more instructions to, based on the image signal being controlled based on the characteristic information of the image signal and the characteristic information of the audio signal, control at least one of brightness, contrast, or color saturation of the image signal based on the illuminance information.

The processor may be further configured to execute the one or more instructions to, based on a learning model that includes one or more neural networks, analyze the image signal and the audio signal of the content in the units of the scenes, detect the characteristic information of the image signal and the characteristic information of the audio signal, and control the image signal and the audio signal.

In accordance with an aspect of the disclosure, there is provided an operating method of an image and audio processing apparatus, the operating method including: analyzing, by the image and audio processing apparatus, an image signal of content in units of the content and detecting characteristic information of the image signal; analyzing, by the image and audio processing apparatus, an audio signal of the content in the units of the content and detecting characteristic information of the audio signal; and controlling, by the image and audio processing apparatus, the image signal in the units of the content to output the image signal through a display of the image and audio processing apparatus, based on the characteristic information of the image signal and the characteristic information of the audio signal; and controlling, by the image and audio processing apparatus, the audio signal in the units of the content to output the audio signal through an audio output interface of the image and audio processing apparatus, based on the characteristic information of the image signal and the characteristic information of the audio signal.

The units of content may be units of scenes.

The operating method may further include: controlling at least one of a black equalizer function, or a contrast and color saturation function with respect to the image signal in the units of the scenes, based on the characteristic information of the image signal and the characteristic information of the audio signal; and controlling at least one of an elevation perception generation and stage expansion function or a sound equalizer application function with respect to the audio signal in the units of the scenes, based on the characteristic information of the image signal and the characteristic information of the audio signal.

The characteristic information of the image signal may include at least one of brightness information, color information, contrast information, or motion information of the image signal, and the characteristic information of the audio signal may include at least one of location information of an audio object, voice information, music information, or sound effect information.

The operating method may further include, based on the image signal being controlled based on the characteristic information of the image signal and the characteristic information of the audio signal, controlling at least one of brightness, contrast, or color saturation of the image signal based on illuminance information with respect to outside of the image and audio processing apparatus, the illuminance information being detected by the image and audio processing apparatus.

In accordance with an aspect of the disclosure, there is provided a computer-readable recording medium having recorded thereon program instructions which are executable by a processor for performing an operating method of a image and audio processing apparatus, the operating method including: analyzing, by the image and audio processing apparatus, an image signal of content in units of the content and detecting characteristic information of the image signal; analyzing, by the image and audio processing apparatus, an audio signal of the content in the units of the content and detecting characteristic information of the audio signal; and controlling, by the image and audio processing apparatus, the image signal in the units of the content to output the image signal through a display of the image and audio processing apparatus, based on the characteristic information of the image signal and the characteristic information of the audio signal; and controlling, by the image and audio processing apparatus, the audio signal in the units of the content to output the audio signal through an audio output interface of the image and audio processing apparatus, based on the characteristic information of the image signal and the characteristic information of the audio signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
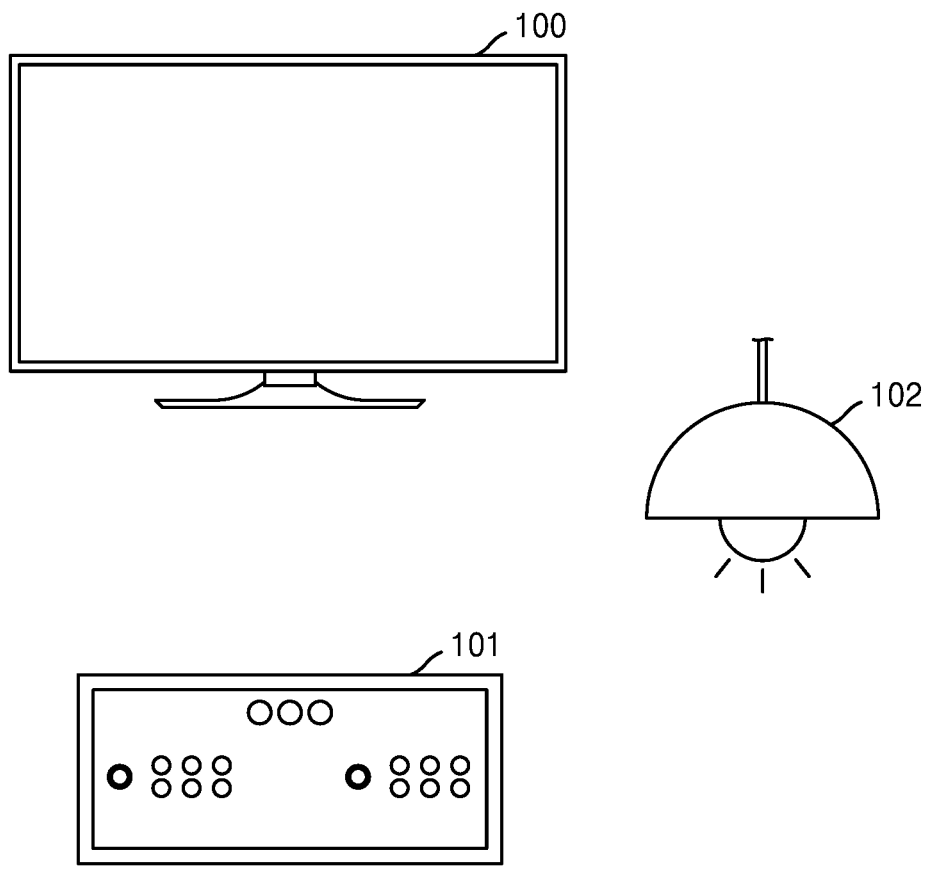
FIG. 1 is a diagram of an image and audio processing apparatus according to an embodiment.

Hereinafter, one or more embodiments will be described in detail with reference to accompanying drawings to the extent that one of ordinary skill in the art would be able to carry out the disclosure. However, the disclosure may be implemented in various manners, and is not limited to one or more embodiments described herein. In addition, components irrelevant with the description are omitted in the drawings for clear description, and like reference numerals are used for similar components throughout the entire specification.

The terms used in the disclosure are selected from among common terms that are currently widely used in consideration of their functions in the disclosure, but the terms may be different according to an intention of one of ordinary skill in the art, a precedent, or the advent of new technology. Therefore, the terms used in the disclosure are not merely designations of the terms, but the terms are defined based on the meaning of the terms and content throughout the disclosure.

The terms used in the specification are merely used to describe particular embodiments, and are not intended to limit the disclosure. An expression used in the singular encompasses the expression of the plural, unless it has a clearly singular meaning in the context. Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Throughout the specification, in particular, in claims, "the" or other similar referring expressions may refer to both a singular form and a plural form. Also, if there is no description explicitly referring to orders of operations included in methods according to the disclosure, the operations may be performed in an appropriate order. The disclosure is not limited to the described orders of operations.

Phrases such as "in some embodiments" or "in one embodiment" throughout the specification may not necessarily denote the same embodiment of the disclosure.

Some embodiments may be represented as functional block structures, various processing stages and/or various processing operations. Some or all of the functional blocks may be realized by any number of hardware and/or software components configured to perform the specified functions. For example, the functional blocks of the disclosure may be realized by one or more microprocessors or circuit structures for performing a predetermined function. In addition, for example, the functional blocks of the disclosure may be implemented with any programming or scripting language. The functional blocks may be implemented in algorithms that are executed on one or more processors. Also, the disclosure may employ any number of conventional techniques for electronics configuration, signal processing and/or, data processing and the like. The words "mechanism," "element," "means," and "configuration" are used broadly and are not limited to mechanical or physical components.

In addition, the connecting lines, or connectors shown in the various figures presented are intended to represent exemplary functional relationships and/or physical or circuit couplings between the various elements. It should be noted that connections between elements by many alternative or additional functional relationships, physical connections or circuit connections may be present in a practical device.

Throughout the disclosure, the expression "at least one of a, b or c" indicates only a, only b, only c, both a and b, both a and c, both b and c, all of a, b, and c, or variations thereof.

FIG. 1 shows an example, in which an image and audio processing apparatus 100 according to an embodiment outputs an image signal and an audio signal that are specialized according to content characteristics (e.g., scene characteristics) obtained by analyzing image and audio signals of content in units of content (e.g., units of scenes).

Referring to FIG. 1, the image and audio processing apparatus 100 may include, but is not limited to, a large screen TV, e.g., may include an electronic device including a display. For example, the image and audio processing apparatus 100 may be implemented as various electronic devices such as a mobile phone, a tablet PC, a digital camera, a camcorder, a laptop computer, a desktop PC, an e-book terminal, a digital broadcasting terminal, a personal digital assistant (PDA), a portable multimedia player (PMP), a navigation device, an MP3 player, a wearable device, a gaming display monitor, etc. Also, the image and audio processing apparatus 100 may be a fixed type or a portable type, and may include a digital broadcasting receiver capable of receiving digital broadcast.

The image and audio processing apparatus 100 may be implemented as a flat panel display apparatus, and moreover may be implemented as a curved display apparatus having a curvature or a flexible display apparatus capable of adjusting curvature thereof. An output resolution of the image and audio processing apparatus 100 may include, for example, high definition (HD), full HD, ultra HD, or higher resolution than ultra HD.

The image and audio processing apparatus 100 may be controlled by a control device 101. The control device 101 may be implemented as various types for controlling the image and audio processing apparatus 100, e.g., a remote controller, a mobile phone, or a game console.

Also, the control device 101 may control the image and audio processing apparatus 100 via a short range wireless communication including infrared ray or Bluetooth. The control device 101 may control the image and audio processing apparatus 100 via a wired communication.

The control device 101 may control functions of the image and audio processing apparatus 100 by using at least one of keys (including buttons) thereof, a touch pad, a microphone (not shown) for receiving voice of a user, or a sensor (not shown) for sensing motions of the control device 101. The control device 101 may be configured as a control pad exclusive for games.

The control device 101 may include a power on/off button for turning on or turning off the image and audio processing apparatus 100. Also, the control device 101 may control the image and audio processing apparatus to perform one or more of change channels, adjust volume, select a terrestrial broadcast/cable broadcast, select a satellite broadcast, or set environment information of the image and audio processing apparatus 100 according to a user input.

In addition, when the control device 101 is a control pad that is exclusive for games or a mobile phone, the control device 101 may transfer game content to the image and audio processing apparatus 100 and control reproduction of the game content in the image and audio processing apparatus 100.

In the specification, a term "user" denotes a person who controls functions or operations of the image and audio processing apparatus 100 by using the control device 101, and may include, but is not limited to, a gamer, a viewer, a manager, or an installation engineer.

The image and audio processing apparatus 100 according to the embodiment may analyze image signals and audio signals of content that is being reproduced in units of the content (e.g., units of scenes) regardless of the control from the control device 101, in order to respectively detect characteristic information of the image signals and audio signals.

The characteristic information of the image signal detected by the image and audio processing apparatus 100 may include, for example, at least one piece of brightness information, color information, contrast information, or motion information, but is not limited thereto. The characteristic information of the audio signal detected by the image and audio processing apparatus 100 may include at least one piece of location information, voice information, music information, or sound effect information of an audio object, but is not limited thereto.

The image and audio processing apparatus 100 may control the image signal in units of scenes by using the detected characteristic information of the image and audio signals, and may cause the display to display the controlled image signal thereon. Through the above process, the image signal displayed on the image and audio processing apparatus 100 denotes an image signal having image quality specialized based on characteristics of each scene.

The image and audio processing apparatus 100 may control an audio signal in units of scenes by using the detected image signal and audio information, and may output the controlled audio signal therethrough. Through the above process, the audio signal output from the image and audio processing apparatus 100 may denote an audio signal having sound that is specialized based on characteristics of each scene.

Also, the image and audio processing apparatus 100 may control at least one of brightness, contrast, or color saturation of the image signal in units of scenes by using illuminance information detected from an illumination 102, such as, a light source 102, around the image and audio processing apparatus 100. To do this, the image and audio processing apparatus 100 may include an illuminance sensor.

Figure 2:
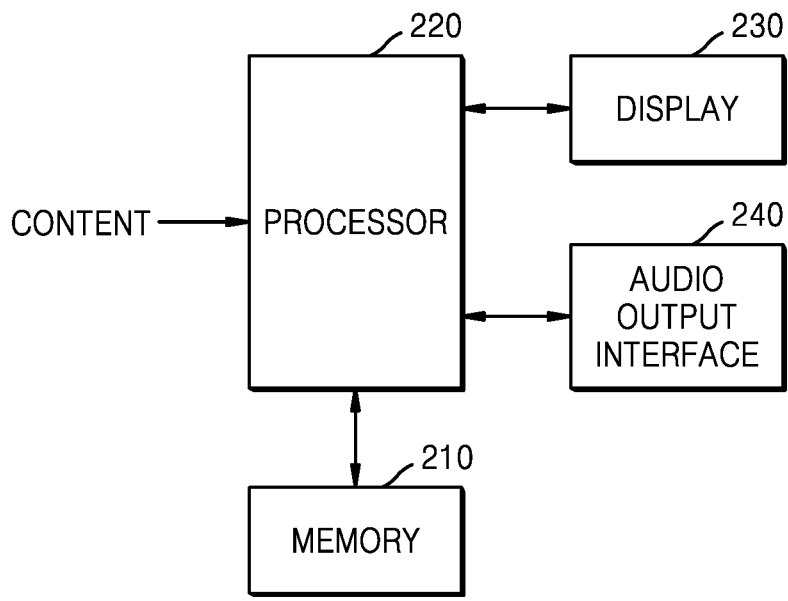
FIG. 2 is a block diagram of an image and audio processing apparatus according to an embodiment.

FIG. 2 is a block diagram of an image and audio processing apparatus 200 according to an embodiment.

The image and audio processing apparatus 200 of FIG. 2 may be an example of the image and audio processing apparatus 100 of FIG. 1. Referring to FIG. 2, the image and audio processing apparatus 200 may include a memory 210, a processor 220, a display 230, and an audio output interface 240. However, the image and audio processing apparatus 200 may include more elements than those of FIG. 2, and is not limited to the above example. For example, the image and audio processing apparatus 200 may further include a content communication interface that obtains content and/or a user input interface that obtains a user input.

The memory 210 according to the embodiment may store programs for processing and controlling the processor 220. The memory 210 may store data (e.g., content) input to or output from the image and audio processing apparatus 200. The memory 210 may store information used to process and control the processor 220. The information used to process and control the processor 220 may include, for example, setting information of the image and audio processing apparatus 200 for providing image quality and sound specialized in units of scenes.

The setting information of the image and audio processing apparatus 200 may include, for example, information used for controlling at least one of the image signal and the audio signal of the scene based on each and/or combinations of brightness information of the image signal, contrast and/or color saturation information of the image signal, motion information of the image signal, location information of an audio object included in the audio signal, voice information included in the audio signal, music information included in the audio signal, and/or sound effect information included in the audio signal.

The setting information of the image and audio processing apparatus 200 may include, for example, information for determining a kind of sound effect (e.g., a gunshot sound, a crowd sound, a car engine sound, etc.) included in the audio signal of the unit (e.g., scene), information for determining brightness of the image signal of the unit (e.g., scene) (e.g., a threshold value of the number of pixels determined as a dark image), and information about a method of controlling the image signal and the audio signal of the unit (e.g., scene) based on characteristic information of the audio signal and the image signal of the unit (e.g., scene), but is not limited thereto.

For example, based on the characteristic information of the image signal of the scene including information indicating that the image signal is dark and the characteristic information of the audio signal of the scene including a gun sound effect (e.g., based on the characteristic information of the image signal of the scene being identified as a scene from an First Person Shooters (FPS) game), the information about the method of controlling the image signal and the audio signal of the unit (e.g., scene) may include information for controlling the image signal so that the processor 220 increases a gain of a gain function of a black equalizer with respect to the image signal and emphasizes the contrast and color saturation for improving visibility of the image signal and controlling the audio signal so that a volume of background sound may be up by applying a sound equalizer.

For example, based on the characteristic information of the image signal of the unit (e.g., scene) including information indicating that the image signal is bright and the characteristic information of the audio signal of the unit (e.g., scene) including a gun sound effect (e.g., based on the characteristic information of the image signal of the scene being identified as a scene from an FPS game), the information about the method of controlling the image signal and the audio signal of the unit (e.g., scene) may include information for controlling the image signal so that the processor 220 reduces a gain of a gain function of a black equalizer with respect to the image signal and emphasizes only the contrast and color saturation and controlling the audio signal so that background sound of the unit (e.g., scene) may be clearly heard by applying a sound equalizer.

For example, based on the characteristic information of the image signal of the unit (e.g., scene) including information indicating that the image signal is bright and the characteristic information of the audio signal of the scene including a voice signal of one person (e.g., based on the characteristic information of the image signal of the unit (e.g., scene) being identified as a unit (e.g., scene) from a general game), the information about the method of controlling the image signal and the audio signal of the scene may include information for controlling the image signal so that the processor 220 does not operate the black equalizer with respect to the image signal of the scene and reduces emphasizing a level of at least one of the contrast and/or color saturation and controlling the audio signal so that a sound effect or background sound of the unit (e.g., scene) may be emphasized by applying a sound equalizer.

For example, based on the characteristic information of the image signal of the unit (e.g., scene) including color information indicating grass color of a playground and the characteristic information of the audio signal of the unit (e.g., scene) including sound of the audience (e.g., based on the characteristic information of the image signal of the unit (e.g., scene) being identified as a unit of content (e.g., scene) from a sports game), the information about the method of controlling the image signal and the audio signal of the unit (e.g., scene) may include information for controlling the image signal so that the processor 220 does not operate the black equalizer with respect to the image signal of the unit (e.g., scene) and may emphasize at least one of contrast and/or color saturation in order to make the grass color clear and/or discriminate a color of a uniform and controlling the audio signal so that a surround sound experience of feeling like being surrounded by roaring of the audience by at least one of: expanding a sound image of a horizontal plane, expanding a stage, or applying the sound equalizer.

For example, based on the characteristic information of the image signal of the unit (e.g., scene) including information indicating a relatively large amount of motion information and a bright screen and the characteristic information of the audio signal of the unit (e.g., scene) including a sound of a car engine (e.g., based on the characteristic information of the image signal of the unit (e.g., scene) being identified as a unit of content (e.g., scene) from a racing game), the information about the method of controlling at least one of the image signal or the audio signal of the unit (e.g., scene) may include at least one of: information for controlling the image signal so that the processor 220 does not operate the black equalizer with respect to the image signal of the unit (e.g., scene) or emphasizing at least one of contrast and/or color saturation in order to make the cars and/or background track clear or controlling the audio signal so that a low bandwidth signal such as the car engine sound may be emphasized by applying the sound equalizer.

For example, based on the characteristic information of the image signal of the unit (e.g., scene) including information indicating a lot of motion information and a dark screen (e.g., based on the characteristic information of the image signal of the unit (e.g., scene) being identified as a unit of content (e.g., scene) of passing through a tunnel) and the characteristic information of the audio signal of the unit (e.g., scene) including a sound of a car engine (e.g., based on the characteristic information of the audio signal of the unit (e.g., scene) being identified as a unit of content (e.g., scene) from a racing game), the information about the method of controlling at least one of the image or audio signal of the unit (e.g., scene) may include information for controlling the image signal so that the processor 220 increases brightness of the screen (or improves visibility) by applying a black equalizer function to the image signal of the unit (e.g., scene) and/or emphasizes at least one of the contrast and/or color saturation to make the cars and/or background track clear, and controlling the audio signal so as to emphasize the low-bandwidth signal such as the car engine sound by applying the sound equalizer.

The memory 210 may include a storage medium of at least one type of a flash memory type, a hard disk type, a multimedia card micro type, a card type memory (e.g., a Secure Digital (SD) memory or an eXtreme Digital (XD) memory, etc.), random access memory (RAM), a static RAM (SRAM), a read-only memory (ROM), an electrically erasable programmable ROM (EEPROM), a programmable ROM (PROM), a magnetic memory, a magnetic disk, or an optical disk.

The processor 220 according to the embodiment may execute one or more instructions stored in the memory 210 to respectively analyze an image signal of content and an audio signal of the content in units of scenes with respect to the content to be reproduced through the display 230 and the audio output interface 240 and detect characteristic information of the image and audio signals. The characteristic information of the image signal and the characteristic information of the audio signal are described above with reference to FIG. 1.

The processor 220 may control the image signal of the unit (e.g., scene) by using at least one of: the characteristic information of the image signal or the audio signal, and then, the specialized image signal may be displayed on the display 230. The processor 220 may control the audio signal of the unit (e.g., scene) by using the characteristic information of at least one of: the image signal or audio signal, and then the specialized audio signal may be output through the audio output interface 240.

For example, based on the audio signal being analyzed in units of scenes including a gunshot sound and the image signal being analyzed in units of scenes being identified as a dark scene, the processor 220 may control the image and audio signals of the unit (e.g., scene) to have the image quality and sound specialized for FPS game content. For example, the processor 220 may control the image signal and the audio signal of the unit (e.g., scene), and thus game items included in the unit (e.g., scene) may have high visibility and a bandwidth of a certain sound effect such as a footstep sound may be reinforced.

Based on identifying that the audio signal analyzed in units of scenes includes the car engine sound and the image signal analyzed in units of scenes includes a large amount of motion information detected from the image signal, the processor 220 may control the image and audio signals of the unit (e.g., scene) to have the image quality and sound that are specialized for racing game content. For example, the processor 220 may control the image and audio signals of the unit (e.g., scene) in order to reinforce the bandwidth of the sound effect of the car engine sound while improving color saturation of the image signal. The large amount of motion information may correspond to an amount of motion information that is above a predetermined threshold amount of motion.

Based on identifying that the audio signal is analyzed in units of scenes includes a voice signal and the image signal analyzed in units of scenes indicates a bright scene, the processor 220 may control the image and audio signals of the unit (e.g., scene) to have image quality and sound that are specialized for general game content. For example, the processor 220 may control the image and audio signals of the unit (e.g., scene) in order to reinforce the bandwidth of the sound effect and/or background sound included in the unit (e.g., scene) without controlling contrast and color saturation of the image signal of the unit (e.g., scene).

In the embodiment, the processor 220 may store one or more instructions in a memory (not shown) that is built therein, and may perform the above operations by executing one or more instructions stored in the memory (not shown) built therein. That is, the processor 220 may perform a certain operation by executing at least one instruction or program stored in the memory (not shown) included in the processor 220 or the memory 210.

Also, in the embodiment, the processor 220 may include a graphic processing unit (GPU) (not shown) for processing graphics corresponding to the image. The processor (not shown) may be implemented as a system on chip (SoC) combining a core (not shown) with a GPU (not shown). The processor (not shown) may include at least one of: a single core, a dual-core, a triple-core, a quad-core, or a multiple-core processor.

The processor 220 may control overall operations of the image and audio processing apparatus 200. For example, the processor 220 may control the display 230 and the audio output interface 240 by executing one or more instructions stored in the memory 210.

Also, FIG. 2 shows one processor 220, but there may be a plurality of processors (not shown). In this case, each of the operations performed by the image and audio processing apparatus 200 according to the embodiment may be executed by at least one of the plurality of processors (not shown). For ease of understanding, the specification discusses the processor, which could refer to one processor or a plurality of processors that perform the functions of the one processor.

The processor 220 may execute one or more instructions stored in the memory 210, and detect characteristic information of the image signal and characteristic information of the audio signal by analyzing the image signal and the audio signal of the content in units of scenes by using a learning model using one or more neural networks stored in the memory 210, and may control at least one of the image or audio signal of the unit (e.g., scene) by using the detected characteristic information of at least one of the image or audio signals.

The neural network may include a set of algorithms that may detect characteristic information respectively from at least one of the image signal or the audio signal input to the neural network based on artificial intelligence (AI) and train so as to learn a method of controlling the image signal and the audio signal in units of scenes based on the detected characteristic information. For example, the neural network may perform recognition (e.g., image recognition, voice/sound recognition) so as to recognize characteristic information from at least one of the image and/or audio signals and learn a method of controlling at least one of the image and audio signals, based on supervised learning that has at least one of the image signal or the audio signal in units of scenes as input values, and unsupervised learning that finds a pattern for recognizing the characteristic information from the image and audio signals by self-learning kinds/types of data that are required to detect the characteristic information respectively from the image and/or audio signals without any supervision. Also, for example, the neural network may detect the characteristic information from the image and/or audio signals in units of scenes and learn the method of controlling the image and audio signals in units of scenes, by using reinforcement learning that uses feedback about whether the image and/or audio signals are controlled appropriately based on the detected characteristic information of the image and/or audio signals.

Also, the neural network may perform operations for inference and prediction according to artificial intelligence (AI) technology. In detail, the neural network may be a deep neural network (DNN) that performs operations through a plurality of layers. The neural network may be classified as a DNN based on a number of the plurality of layers, that is, a depth of the neural network performing the operation increases, according to the number of internal layers performing the operation. In addition, the DNN operation may include a convolution neural network (CNN) operation. That is, the processor 220 may implement a model for detecting characteristic information of at least one of the image signal and the audio signal through the neural network of the example, and the implemented model may be learned by using learning data. In addition, the at least one of the image signal and the audio signal in units of scenes in the content to be reproduced may be analyzed or classified by using a learned model to detect the characteristic information of at least one of the image signal and the audio signal of the unit (e.g., scene).

For example, the processor 220 may detect characteristic information by respectively analyzing at least one of the image signal and the audio signal of the content to be reproduced in units of scenes, by using a learning model using one or more neural networks. For example, the processor 220 may detect at least one of brightness information, contrast information, or color information of an image signal in a scene and/or at least one of location information of an audio object, voice information, music information, or sound effect information of the audio signal, by performing operations through the DNN.

The processor 220 may control at least one of: the image signal and the audio signal in units of scenes based on the characteristic information of at least one of: the image and audio signals detected by using the neural network. For example, the processor 220 may control at least one of a black equalizer function, contrast, or color saturation with respect to the image signal and/or at least one of a function of generating elevation perception and expanding stage with respect to the audio signal, or a sound equalizer function with respect to the audio signal in units of scenes, by using the characteristic information of at least one of the image and audio signals detected by using the neural network.

The processor 220 may control the display 230 to output (display) the image signal that is controlled in units of scenes. According to the embodiment, the processor 220 may control the audio output interface 240 to output the audio signal that is controlled in units of scenes.

The display 230 according to the embodiment may display the image signal that is controlled in units of scenes. For example, based on a scene being from an FPS game and including a dark image signal, the display 230 may display an image signal for providing high visibility of game items included in the scene. Based on a scene being from a sports game, the display 230 may display an image signal that is controlled to emphasize at least one of the contrast and/or color saturation so that the uniform(s) of each team may be clearly distinguished.

When the display 230 is implemented as a touch screen, the display 230 may be also used as an input device, as well as the output device. For example, the display 230 may include at least one of a liquid crystal display, a thin film transistor-liquid crystal display, an organic light-emitting diode, a flexible display, a three-dimensional (3D) display, or an electrophoretic display. In addition, according to implementation type of the image and audio processing apparatus 200, the image and audio processing apparatus 200 may include two or more displays 230.

The audio output interface 240 may output an audio signal that is controlled in units of scenes according to control of the processor 220. The audio output interface 240 may include at least one of a speaker, a headphone output terminal, or a Sony/Philips digital interface (S/PDIF) output terminal, but is not limited thereto.

For example, based on a scene being from an FPS game and including a dark image signal, the audio output interface 240 according to the embodiment may output an audio signal obtained by generating an elevation perception or expanding a sound stage of the audio signal (e.g., footstep sound) included in the unit (e.g., scene). Also, based on the scene being from a sports game, the audio output interface 240 may output an audio signal obtained by generating an elevation perception and expanding a sound image of a horizontal plane of the sound effect (e.g., roaring sound) included in the audio signal of the unit (e.g., scene).

Figure 3:
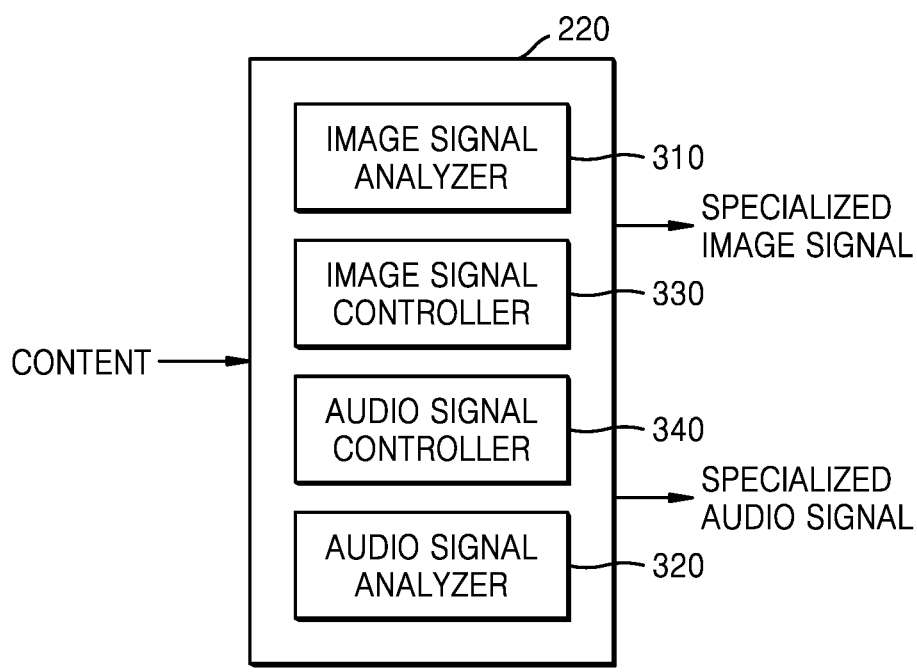
FIG. 3 is a block diagram of a processor of FIG. 2, according to an embodiment.

FIG. 3 is a block diagram of the processor 220 of FIG. 2.

In FIG. 3, the processor 220 of FIG. 2 includes an image signal analyzer 310, an audio signal analyzer 320, an image signal controller 330, and an audio signal controller 340, but elements included in the processor 220 are not limited thereto.

The image signal analyzer 310 may analyze the image signal in units of scenes. For example, the image signal analyzer 310 may identify whether the scene is dark or bright according to a histogram distribution of black area, and provide an identification result to at least one of the image signal controller 330 and the audio signal controller 340. The image signal analyzer 310 may use a threshold value in the number of pixels, which indicates the dark region, stored in the memory 210, in order to identify whether the scene is dark or bright according to the histogram distribution of the black area.

The image signal analyzer 310 may perform a histogram analyzation and detail analyzation of a black region in each local area, as well as the histogram analysis of the black region in units (e.g., frame units with respect to one scene), in order to more accurately analyze the image signal in units of scenes.

The audio signal analyzer 320 may analyze the audio signal in units of scenes. For example, the audio signal analyzer 320 may detect at least one of location information of an audio object, voice information, music information, or sound effect information included in the audio signal in units of scenes. The audio signal analyzer 320 may use information about the sound effect stored in the memory 210 in order to detect the sound effect. The information about the sound effect stored in the memory 210 may include information for identifying a kind/type of the sound effect. The audio signal analyzer 320 may provide a result of analyzing the audio signal to at least one of the image signal controller 330 and the audio signal controller 340.

The image signal controller 330 may control at least one of a black equalizer function, contrast, or color saturation function with respect to the image signal in units of scenes, by using the image signal analysis result provided from at least one of the image signal analyzer 310 and the audio signal analysis result provided from the audio signal analyzer 320. Accordingly, the image signal controller 330 may output an image signal having image quality specialized for the scene.

Figure 4:
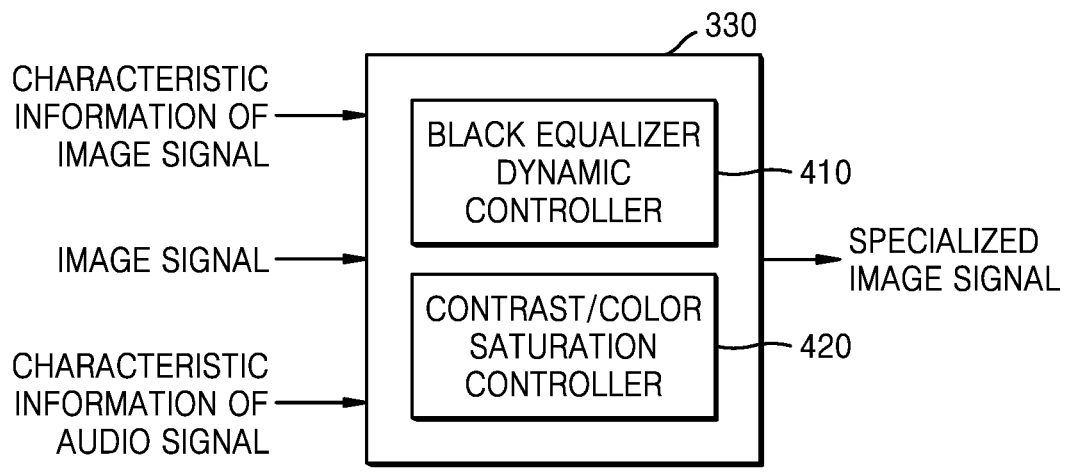
FIG. 4 is a block diagram of an image signal controller of FIG. 3, according to an embodiment.

FIG. 4 is a block diagram of the image signal controller 330 of FIG. 3.

Referring to FIG. 4, the image signal controller 330 may include at least one of a black equalizer dynamic controller 410 and a contrast/color saturation controller 420.

The black equalizer dynamic controller 410 may control brightness of the image signal by using characteristic information of at least one of an input image signal or an audio signal, in order to improve black visibility in a dark area in the input image signal.

The contrast/color saturation controller 420 may control contrast and/or color saturation of the input image signal by using the characteristic information of at least one of: the input image signal and or the audio signal.

For example, based on information indicating a sound effect corresponding to a gun shoot sound being obtained from the audio signal analyzer 320 and information indicating that the unit (e.g., scene) is a dark unit (e.g., scene) being provided from the image signal analyzer 310, the image signal controller 330 may control brightness of the image signal by increasing a gain value (e.g., a gain value of the black equalizer) of the black equalizer dynamic controller 410 so that the dark unit (e.g., scene) becomes bright, and may control the image signal by using the contrast/color saturation controller 420 so that at least one of the contrast and color saturation of the image signal may be emphasized.

Based on information about a sound effect of a car engine sound being provided from the audio signal analyzer 320 and motion information (a relatively large amount of motion information) indicating a fast moving scene and information indicating a bright scene are provided from the image signal analyzer 310, the image signal controller 330 may control the image signal by using the at least one of contrast/color saturation controller 420 so as to emphasize the at least one of contrast/color saturation without using the black equalizer dynamic controller 410.

For example, based on information about a sound effect of a car engine sound being provided from at least one of the audio signal analyzer 320 and motion information (a large amount of motion information) indicating a fast moving scene and information indicating a dark scene being provided from the image signal analyzer 310, the image signal controller 330 may control the image signal to brighten the screen by using the black equalizer dynamic controller 410 and may control the image signal to emphasize the color of the image signal by using the contrast/color saturation controller 420.

For example, based on the sound effect and background sound provided from the audio signal analyzer 320 being identified as general game content and information indicating a dark scene being provided from the image signal analyzer 310, the image signal controller 330 may control the image signal so as not to excessively emphasize at least one of: the contrast and color saturation without using the black equalizer function.

The audio signal controller 340 of FIG. 3 may control at least one of a function of generating elevation perception and expanding stage with respect to the audio signal, or a sound equalizer function with respect to the audio signal in units of scenes, by using the result of analyzing the image signal provided from the image signal analyzer 310 and the result of analyzing the audio signal provided from the audio signal analyzer 320. Accordingly, the audio signal controller 340 may output an audio signal having sound specialized for the scene (e.g., sound quality specialized for the scene).

Figure 5:
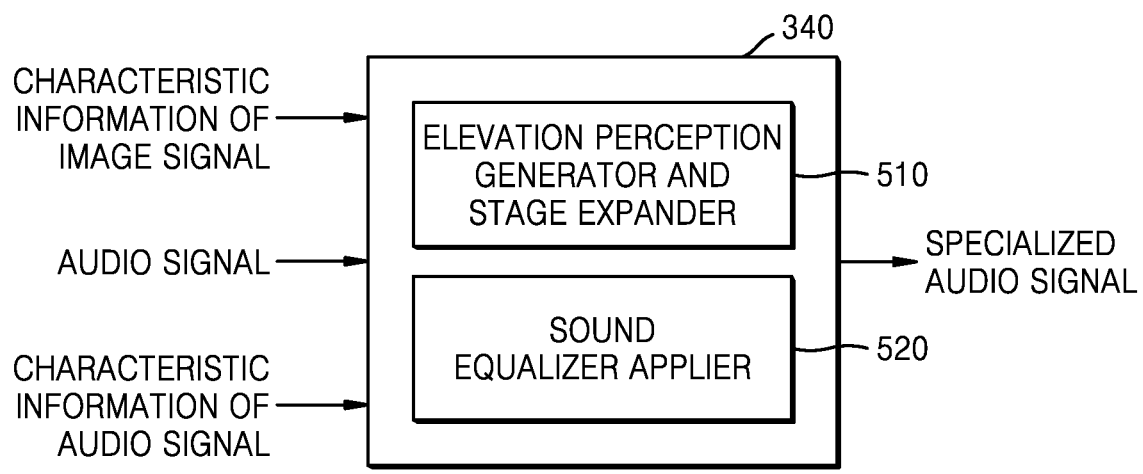
FIG. 5 is a block diagram of an audio signal controller of FIG. 3, according to an embodiment.

FIG. 5 is a block diagram of the audio signal controller 340 of FIG. 3.

Referring to FIG. 5, the audio signal controller 340 may include, but is not limited to, at least one of: an elevation perception generator and stage expander 510 and a sound equalizer applier 520.

The elevation perception generator and stage expander 510 may at least one of reinforce motion of an audio object or may expand a sound stage. For example, based on an audio signal of a scene including a sound effect, the elevation perception generator and stage expander 510 may generate an elevation perception of the sound effect and may expand a horizontal plane sound image. For example, based on the audio signal of the unit (e.g., scene) including roaring sound in a stadium, the elevation perception generator and stage expander 510 may perform expansion of a horizontal sound image and expansion of a stage with respect to the roaring sound to provide a user with a sound experience as if the user is surrounded by the roaring sound. The generation of elevation perception and the expansion of the horizontal plane sound image may be realized by a head-related transfer function (HRTF) that is widely used in audio signal processing field, but is not limited thereto. The expansion of the stage may be implemented in a manner of adding opposite phase signals of different audio channel to each channel, but is not limited thereto.

The sound equalizer applier 520 may apply a discriminative equalizer to each unit (e.g., scene) by using an input audio signal. For example, based on an audio signal of a unit (e.g., scene) including a car engine sound, the sound equalizer applier 520 may be controlled to reinforce a low bandwidth component, and then, a realistic car engine sound may be provided to the user. For example, based on an audio signal of a unit (e.g., scene) including music, the sound equalizer applier 520 may be controlled to reinforce both or at least one of: low-bandwidth and high-bandwidth components and instrument sound expanding throughout entire or partial bandwidths may be provided to the user.

Also, for example, based on information indicating a sound effect of a gunshot sound being provided from the audio signal analyzer 320 and information indicating that the scene is a dark scene being provided from the image signal analyzer 310, the audio signal controller 340 may control the audio signal to reinforce background sound by using the sound equalizer applier 520.

Based on information about a sound effect of a car engine sound being provided from the audio signal analyzer 320 and motion information indicating a fast moving scene and information indicating a bright scene being provided from the image signal analyzer 310, the audio signal controller 340 may control the audio signal to reinforce a low-bandwidth component such as the car engine sound by using the sound equalizer applier 520.

Based on information about at least one of: a sound effect of a car engine sound being provided from the audio signal analyzer 320 and motion information indicating a fast moving unit of content (e.g., scene) and information indicating a dark unit of content (e.g., scene) being provided from the image signal analyzer 310, the audio signal controller 340 may control the audio signal to reinforce a low-bandwidth component such as the car engine sound by using the sound equalizer applier 520.

Based on information indicating detection of voice being provided from the audio signal analyzer 320 and information indicating a dark scene being provided from the image signal analyzer 310, the audio signal controller 340 may emphasize at least one of a sound effect and a background sound by expanding at least one of the sound effect and the background sound by using the elevation perception generator and stage expander 510 and may control the audio signal to reinforce the low-bandwidth component and the high-bandwidth component by using the sound equalizer applier 520.

Also, for example, based at least one of: obtained characteristic information of the image signal indicating a dark unit of content (e.g., scene) and received characteristic information of the audio signal including a footstep sound, the sound equalizer applier 520 may reinforce a bandwidth of a certain sound effect such as the footstep sound to provide clear footstep sound to the user.

For example, based on the obtained characteristic information of the image signal including a large amount of motion information, the audio signal controller 340 may expand a sound image of the audio object included in the obtained audio signal by using the elevation perception generator and stage expander 510 and may control the audio signal to reinforce the sound effect included in the audio signal by using the sound equalizer applier 520.

Figure 6:
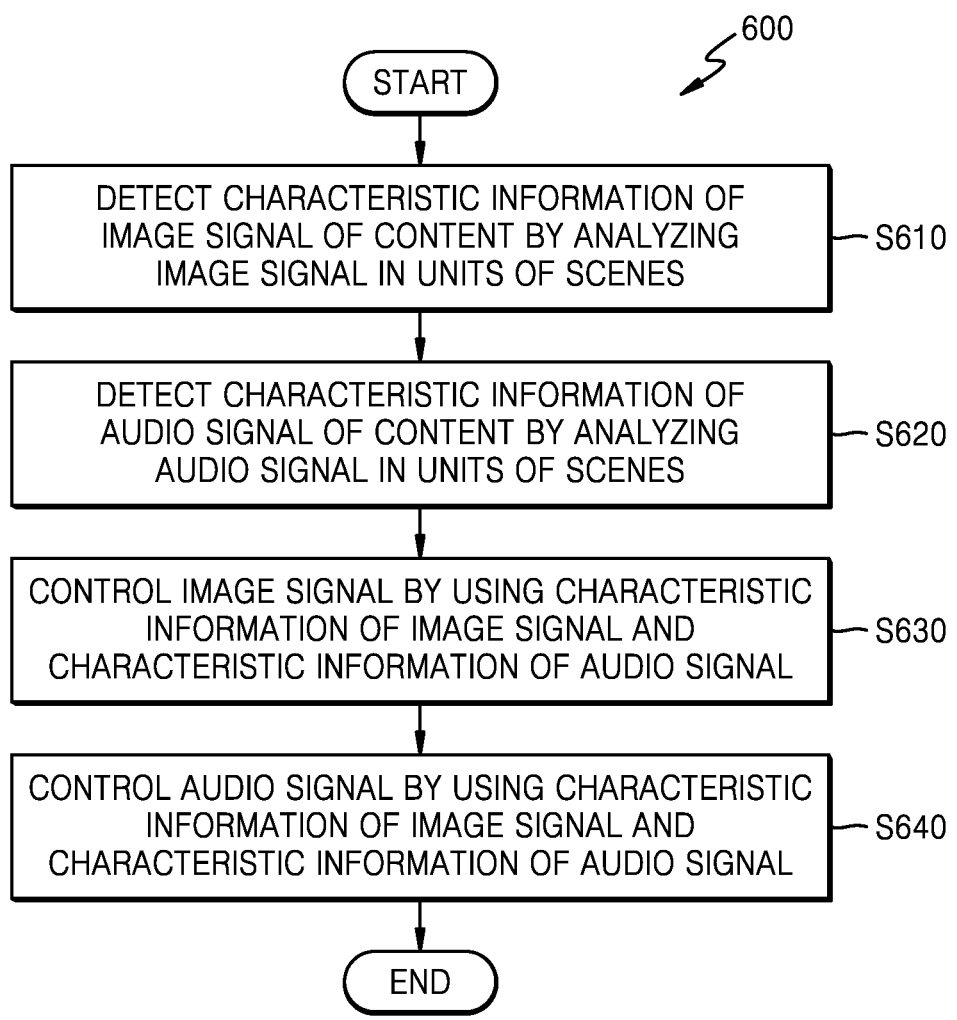
FIG. 6 is a flowchart illustrating operations of an image and audio processing apparatus according to an embodiment.

FIG. 6 is a flowchart illustrating operations of an image and audio processing apparatus according to an embodiment. The method (600) of operating the image and audio processing apparatus illustrated with reference to FIG. 6 may include operations performed in the image and audio processing apparatus 100 or 200 according to the embodiment described above with reference to FIG. 1 or FIG. 2. Therefore, in detailed operations of the method (600) of operating the image and audio processing apparatus, descriptions about the same operations as those performed in the image and audio processing apparatus 100 or 200 according to the embodiment are omitted. The method (600) of operating the image and audio processing apparatus of FIG. 6 shows a case in which an image signal and an audio signal of content are respectively analyzed in units of scenes to control at least one of the image and audio signals.

Referring to FIG. 6, in operation S610, the image and audio processing apparatus 100 may detect characteristic information of the image signal by analyzing the image signal of the content in units of scenes. Processes of analyzing the image signal and detecting characteristic information of the image signal in operation S610 may be the same as those of FIGS. 1 to 5. The characteristic information of the image signal is described above with reference to FIG. 1.

In operation S620, the image and audio processing apparatus 100 may analyze an audio signal of the content in units of scenes to detect characteristic information of the audio signal. Processes of analyzing the audio signal and detecting characteristic information of the audio signal in operation S620 may be the same as those of FIGS. 1 to 5. The characteristic information of the audio signal is described above with reference to FIG. 1.

In operation S630, the image and audio processing apparatus 100 may control the image signal based on at least one of the characteristic information of the image signal and the characteristic information of the audio signal. The controlling of the image signal performed in operation S630 is described above with reference to FIGS. 1 to 5.

In operation S640, the image and audio processing apparatus 100 may control the audio signal based on at least one of the characteristic information of the image signal and the characteristic information of the audio signal. The controlling of the audio signal performed in operation S640 is described above with reference to FIGS. 1 to 5.

Figure 7:
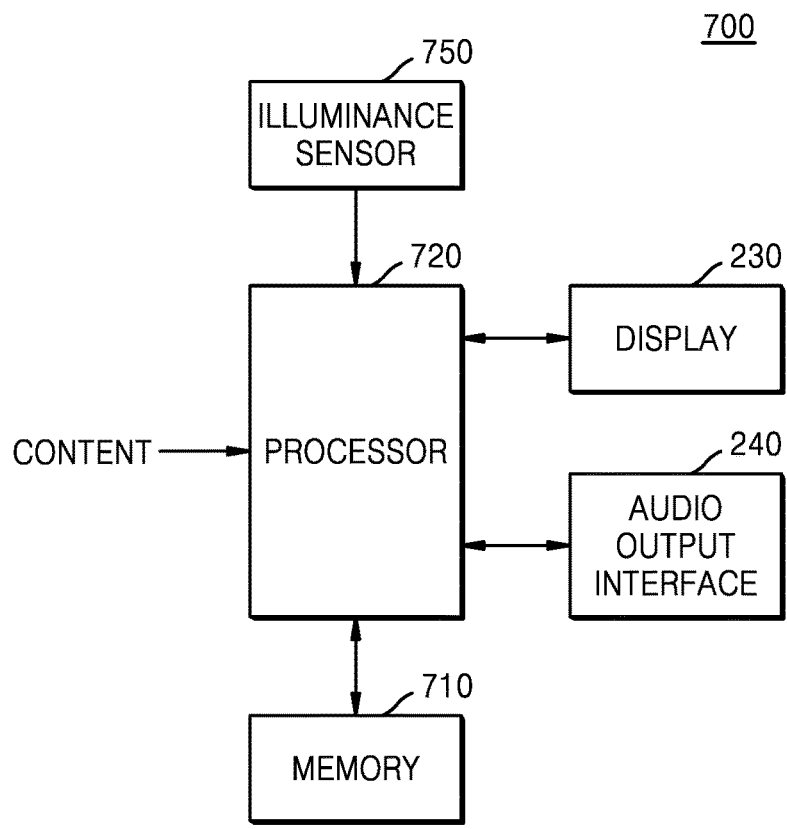
FIG. 7 is a block diagram of an image and audio processing apparatus according to another embodiment.

FIG. 7 is a block diagram of an image and audio processing apparatus 700 according to another embodiment.

In FIG. 7, the same elements as those of FIG. 2 are denoted by the same reference numerals. Therefore, descriptions about the elements in the image and audio processing apparatus 700, which may be the same as those illustrated with reference to FIGS. 1 to 5, are omitted.

Referring to FIG. 7, the image and audio processing apparatus 700 may further include an illuminance sensor 750, as compared with the image and audio processing apparatus 200 of FIG. 2.

The illuminance sensor 750 may detect peripheral illuminance information outside of the image and audio processing apparatus 700. The peripheral illuminance information denotes environmental information around the image and audio processing apparatus 700. The environmental information around the image and audio processing apparatus 700 is not limited to the illuminance information. For example, when the audio output interface 240 of the image and audio processing apparatus 700 is a speaker, the environmental information around the image and audio processing apparatus 700 may include surrounding sound (e.g., noise). The illuminance sensor 750 may indicate brightness information as a magnitude value, and detected peripheral illuminance information may include brightness information of an illumination 102 around the image and audio processing apparatus 700 detected as a magnitude value.

A memory 710 may store information about a relation between a gain value of the black equalizer and an illuminance value. The image and audio processing apparatus 700 may compensate for an intensity of the black equalizer according to a peripheral illuminance of the image and audio processing apparatus 700 based on the information about the relation between the gain value of the black equalizer and the illuminance value stored in the memory 710, in order to provide consistent visibility with respect to the content. That is, the image and audio processing apparatus 700 may finally determine a gain value of the black equalizer to be applied, based on a gain value of the black equalizer determined according to at least one of the characteristic information of the image signal, the characteristic information of the audio signal, detected illuminance information, and the above relation information stored in the memory 710.

Figure 8:
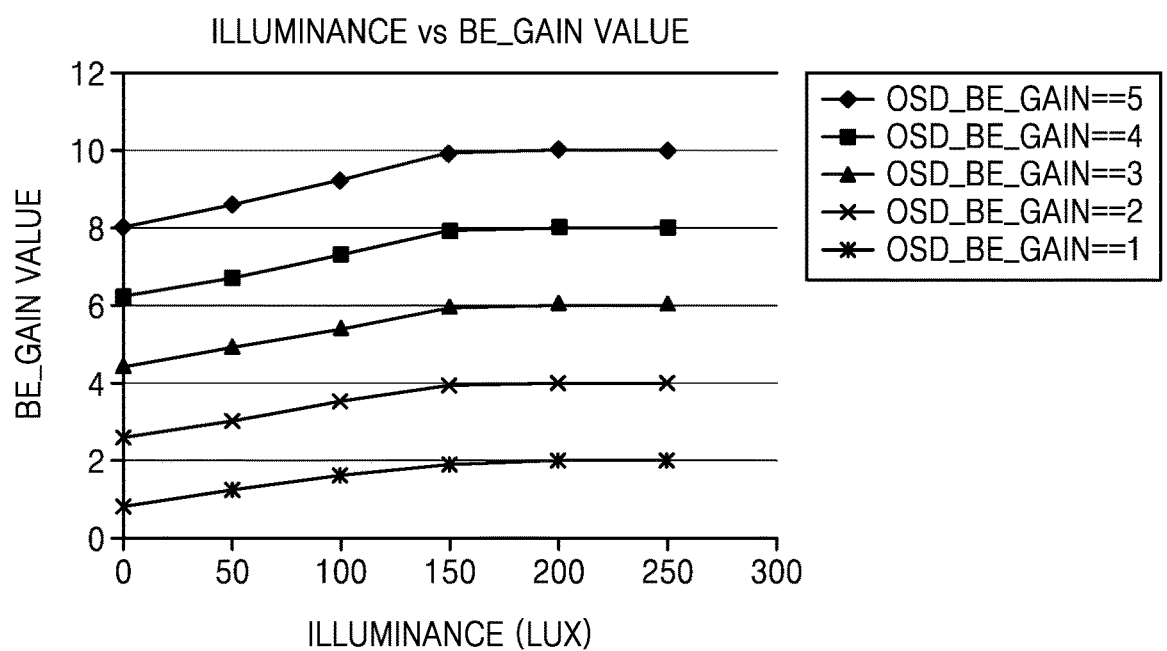
FIG. 8 is a diagram showing an example of a final gain value of a black equalizer based on a gain value of the black equalizer and illuminance information, according to an embodiment.

FIG. 8 is a graph showing an example of a final gain value of the black equalizer based on a gain value (BE_GAIN, or gain control value) of the black equalizer and illuminance information, according to an embodiment. In the example of FIG. 8, based on the illuminance information having a predetermined value (e.g., a value of 150 Lux), the gain value of the black equalizer may be expressed as a linear equation.

Based on the image signal being controlled based on at least one of the characteristic information of the image signal and characteristic information of the audio signal detected by respectively analyzing at least one of the image signal and the audio signal of the content in units of scenes, a processor 720 may control the black equalizer by using a final gain value of the black equalizer, which may be identified based on at least one of illuminance information detected by the illuminance sensor 750 and the relation between the gain value of the black equalizer and the illuminance information stored in the memory 710.

Also, based on the audio signal being controlled based on at least one of: characteristic information of the image signal and characteristic information of the audio signal detected by respectively analyzing at least one of the image signal and the audio signal of the content in units of scenes, the processor 720 may control the audio signal based on a brightness of the image signal that is to be controlled based on the final gain value of the black equalizer, which may be identified based on at least one of illuminance information detected by the illuminance sensor 750 and the relation between the gain value of the black equalizer and the illuminance information stored in the memory 710.

Figure 9:
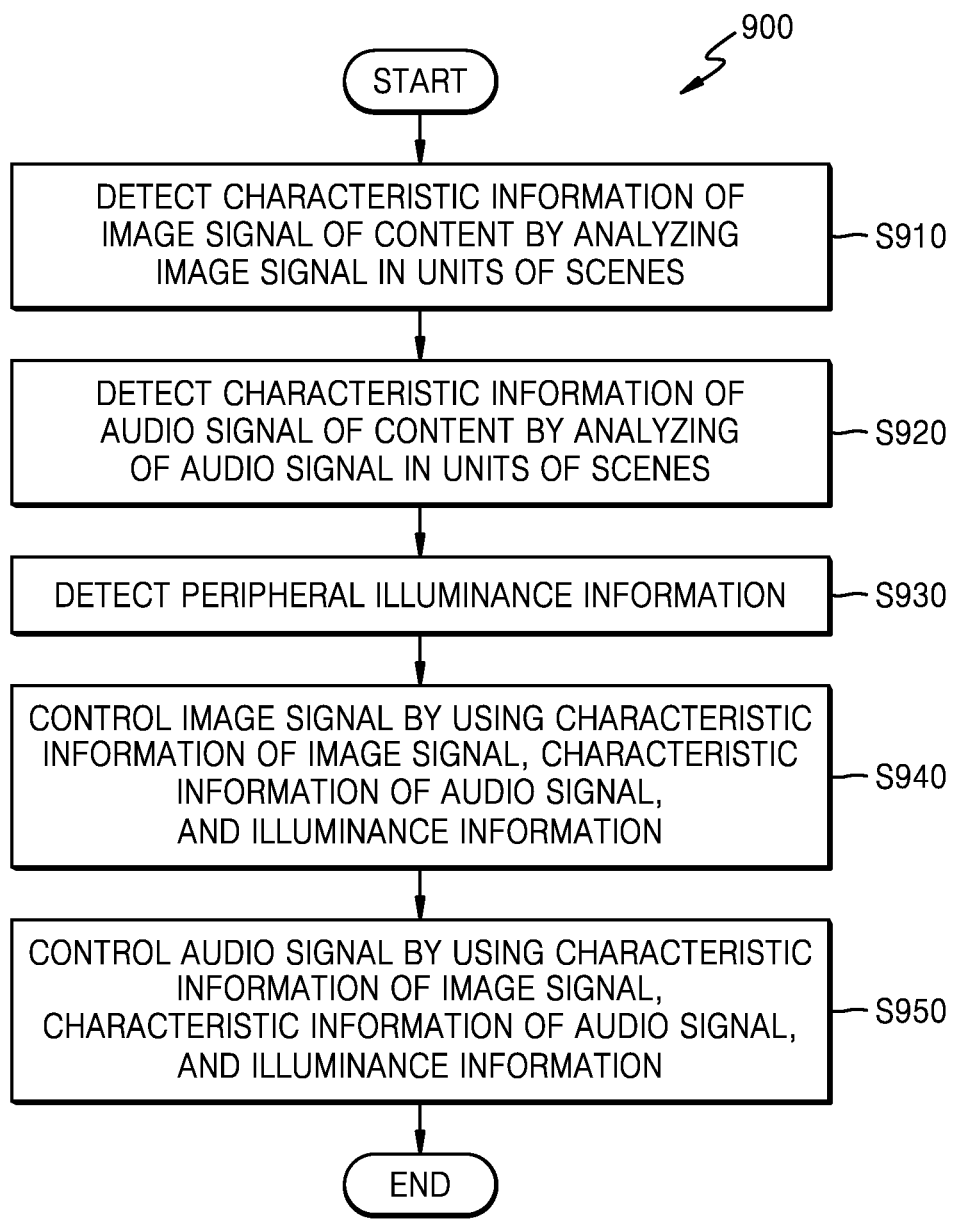
FIG. 9 is a flowchart illustrating operations of an image and audio processing apparatus according to another embodiment.

FIG. 9 is a flowchart illustrating operations of an image and audio processing apparatus, according to another embodiment. A method (900) of operating the image and audio processing apparatus illustrated with reference to FIG. 9 may include operations performed in the image and audio processing apparatus 100 or 700 according to the embodiment described above with reference to FIG. 1 or FIG. 7. Therefore, in detailed operations of the method (900) of operating the image and audio processing apparatus, descriptions about the same operations as those performed in the image and audio processing apparatus 100 or 700 according to the embodiment are omitted.

In operation S910, the image and audio processing apparatus 700 may analyze an image signal of the content in units of scenes to detect characteristic information of the image signal. Analyzing of the image signal of the content and detecting of the characteristic information of the image signal performed in operation S910 may be performed as in operation S610. The characteristic information of the image signal described in operation S910 is described above with reference to FIG. 1.

In operation S920, the image and audio processing apparatus 700 may analyze an audio signal of the content in units of scenes to detect characteristic information of the audio signal. Analyzing of the audio signal of the content and detecting of the characteristic information of the audio signal performed in operation S920 may be performed as in operation S620. The characteristic information of the audio signal described in operation S920 is described above with reference to FIG.

In operation S930, the image and audio processing apparatus 700 may detect peripheral illuminance information of the image and audio processing apparatus 700. Detecting of the peripheral illuminance information in operation S930 may be the same as that described with reference to FIG. 7.

In operation S940, the image and audio processing apparatus 700 may control the image signal based on at least one of: the characteristic information of the image signal, the characteristic information of the audio signal, and the illuminance information. Controlling of the image signal performed in operation S940 may be the same as that described above with reference to FIG. 7.

In operation S950, the image and audio processing apparatus 700 may control the audio signal based on at least one of: the characteristic information of the image signal, the characteristic information of the audio signal, and the illuminance information. Controlling of the audio signal performed in operation S950 may be the same as that described above with reference to FIG. 7.

Figure 10:
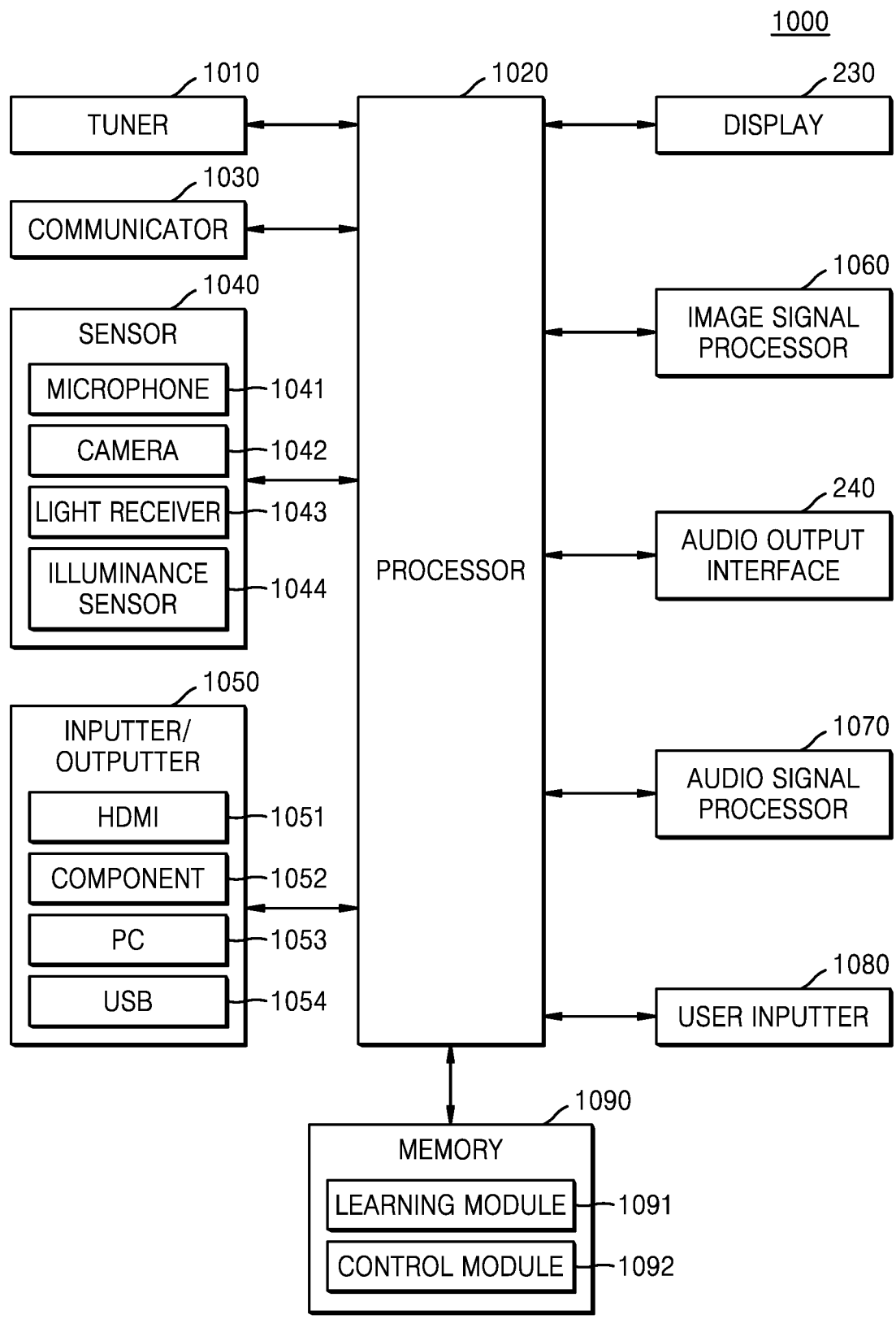
FIG. 10 is a block diagram of an image and audio processing apparatus according to another embodiment.

FIG. 10 is a block diagram of an image and audio processing apparatus 1000 according to another embodiment.

As shown in FIG. 10, the image and audio processing apparatus 1000 may further include a tuner 1010, a processor 1020, a communicator 1030, a sensor 1040, an inputter/outputter 1050, an image signal processor 1060, an audio signal processor 1070, and a user inputter 1080, in addition to the display 230 and the audio output interface 240.

Descriptions about the display 230 and the audio output interface 240, which are already provided above with reference to FIG. 2, are omitted.

The tuner 1010 may tune and select a frequency of a channel to be received by the image and audio processing apparatus 1000, from among many wave components, through amplification, mixture, resonance, etc. of broadcast signal that is received wirelessly or through wires. The tuner 1010 may be a television (TV) tuner. The broadcast signal may include audio, video, and additional information (e.g., electronic program guide (EPG) information).

The broadcast signal received by the tuner 1010 may be decoded (e.g., audio decoding, video decoding, or additional information decoding) and may be separated as audio, video, and/or additional information. The separated audio, video, and/or additional information may be controlled by the processor 1020 and stored in a memory 1090.

The image and audio processing apparatus 1000 may include one or more tuners 1010. The tuner 1010 may be implemented integrally with the image and audio processing apparatus 1000 (all-in-one) or an additional device having a tuner electrically connected to the image and audio processing apparatus 1000 (e.g., a set-top box (not shown), a tuner (not shown) connected to the inputter/outputter 1050).

The communicator 1030 may connect the image and audio processing apparatus 1000 to an external device (e.g., an audio device, a server, a content providing device, etc.) according to control of the processor 1020. The communicator 1030 may be a communication interface. The processor 1020 may at least one of: transmit/receive content to/from the external device connected through the communicator 1030, download an application from the external device, or perform web-browsing.

The communicator 1030 may be a communication interface. The communicator 1030 may include one or more of a wireless LAN, a Bluetooth, or a wired Ethernet, in correspondence with the performance and structure of the image and audio processing apparatus 1000. Alternatively, the communicator 1030 may include a combination of the wireless LAN, Bluetooth, and wired Ethernet. The communicator 1030 may receive a control signal from a control device 101 according to the control of the processor 1020. The control signal may be implemented as a Bluetooth type, a radio frequency (RF) signal type, or a Wi-Fi type.

The communicator 1030 may further include another near field communicator (e.g., near field communication (NFC) interface (not shown), and Bluetooth Low Energy (BLE) interface (not shown)), in addition to the Bluetooth.

The communicator 1030 according to the embodiment may obtain a information regarding a learning model based on one or more neural networks from an external server. Also, the communicator 1030 may obtain new information from the external server with a preset cycle, in order to update information that may be used to analyze at least one of the image signal and the audio signal stored in the memory 1090.

The sensor 1040 may detect at least one of: a voice of the user, an image of the user, an interaction of the user, and illuminance around the image and audio processing apparatus 1000, and may include at least one of: a microphone 1041, a camera 1042, a light receiver 1043, or an illuminance sensor 1044.

The microphone 1041 may obtain a voice uttered by the user. The microphone 1041 may convert the obtained voice into an electrical signal and may output the electrical signal to the processor 1020.

The camera 1042 may obtain an image (e.g., successive frames) corresponding to a motion of the user including gesture, within a camera recognition range.

The light receiver 1043 may obtain an optical signal (including a control signal) from the control device 101. The light receiver 1043 may receive an optical signal corresponding to a user input (e.g., touch, push, touch gesture, voice, or motion) from the control device 101. The processor 1020 may detect a control signal from the optical signal.

The light receiver 1043 according to the embodiment may receive an optical signal corresponding to a user input regarding content reproduction, from the control device 101.

The illuminance sensor 1044 may detect illuminance information based on illuminance of the illumination 102 outside of the image and audio processing apparatus 1000 like the illuminance sensor 750 of FIG. 7, but a detection range of the illuminance sensor 1044 is not limited thereto. For example, the illuminance sensor 1044 may detect illuminance of a light (e.g., sunlight) around the image and audio processing apparatus 1000.

The inputter/outputter 1050 is controlled by the processor 1020 to obtain a video (e.g., moving pictures, etc.), audio (e.g., voice, music, etc.), and additional information (e.g., EPG, etc.) from the outside of the image and audio processing apparatus 1000. The inputter/outputter 1050 may include at least one of a high-definition multimedia interface (HDMI) port 1051, a component jack 1052, a PC port 1053, or a universal serial bus (USB) port 1054. The inputter/outputter 1050 may include at least one of or a combination of the HDMI port 1051, the component jack 1052, the PC port 1053, and the USB port 1054.

A memory 1090 according to the embodiment may store programs for processing and controlling the processor 1020, and data input to or output from the image and audio processing apparatus 1000. Also, the memory 1090 may store data that is required to operate the image and audio processing apparatus 1000. The data required to operate the image and audio processing apparatus 1000 may include information stored in the memory 210 as described above with reference to FIG. 2.

Also, the programs stored in the memory 1090 may be classified as a plurality of modules according to functions thereof. In detail, the memory 1090 may store one or more programs for executing a predetermined operation by using a neural network. For example, the one or more programs stored in the memory 1090 may be classified as a learning module 1091 and a control module 1092.

The learning module 1091 may include a learning model that learns a method of, based on an input of content into one or more neural networks, analyzing at least one of an image signal of content and an audio signal of the content in units of scenes to detect characteristic information and may control at least one of the image signal and the audio signal of the scene by using the detected characteristic information.

The learning model may be obtained from an external server, and the learning model may be stored in the learning module 1091.

The control module 1092 may store a program that the processor 1020 executes one or more instructions, and then may perform controlling of at least one of the image signal and the audio signal according to at least one of characteristic information of the image signal and characteristic information of the audio signal obtained based on information used to analyze at least one of the image signal and the audio signal and a result of analyzing the image signal and the audio signal of the content in units of scenes. For example, the control module 1092 may store a program that the processor 1020, based on input content, detects at least one of characteristic information of the image signal and characteristic information of the audio signal by comparing the result of analyzing at least one of the image signal and the audio signal with stored information, controls the image signal processor 1060 and the display 230 to output the image signal controlled in units of scenes and controls the audio signal processor 1070 and the audio output interface 240 to output the audio signal controlled in units of scenes, by providing at least one of operating condition information for controlling the image signal and operating condition information for controlling the audio signal according to the detected characteristic information of the image signal and audio signal to the processor 1020.

In addition, one or more programs for performing predetermined operations by using the neural network or one or more instructions for performing predetermined operations by using the neural network may be stored in an internal memory (not shown) in the processor 1020.

The processor 1020 may control overall operations of the image and audio processing apparatus 1000 and flow of signals among internal components of the image and audio processing apparatus 1000, and process the data. Based on a user input being entered or a stored preset condition being satisfied, the processor 1020 may execute an operation system (OS) and various applications stored in the memory 1090.

Also, the processor 1020 may include an internal memory (not shown). In this case, at least one of data, programs, or instructions stored in the memory 1090 may be stored in the internal memory (not shown) of the processor 1020. For example, the internal memory (not shown) of the processor 1020 may store one or more programs for performing predetermined operations by using the neural network, or one or more instructions for performing predetermined operations by using the neural network.

The image signal processor 1060 may process image data to be displayed on the display 230, and may perform various image processing operations such as at least one of decoding, rendering, scaling, noise filtering, frame rate conversion, and resolution conversion on the image data. In particular, the image signal processor 1060 may be controlled by the processor 1020 to perform functions corresponding to those of at least one of the black equalizer dynamic controller 410 and the contrast/color saturation controller 420 shown in FIG. 4.

The display 230 may be controlled by the processor 1020 to display a video included in the broadcast signal obtained through the tuner 1010. Also, the display 230 may display content (e.g., video) input through the communicator 1030 and/or the inputter/outputter 1050. The display 230 may output the image stored in the memory 1090 according to control of the processor 1020. The display 230 may be controlled by the processor 1020 to display the image signal processed by the image signal processor 1060.

The audio signal processor 1070 may process audio data. The audio signal processor 1070 may perform various processes such as one or more of decoding, amplifying, noise filtering, etc. on the audio data. Also, the audio signal processor 1070 may be controlled by the processor 1020 to perform functions corresponding to those of at least one of the elevation perception generator and stage expander 510 and the sound equalizer applier 520 of FIG. 5.

The audio output interface 240 may be controlled by the processor 1020 to output the audio signal included in the broadcast signal obtained through the tuner 1010, the audio signal input through the communicator 1030 or the inputter/outputter 1050, and the audio signal stored in the memory 1090. The audio output interface 240 may include at least one of a speaker, a headphone output terminal, or S/PDIF output terminal. The audio output interface 240 is controlled by the processor 1020 to output the audio signal processed by the audio signal processor 1070.

The user inputter 1080 may be a component (e.g., an interface) through which data for controlling the image and audio processing apparatus 1000 may be input by the user. For example, the user inputter 1080 may include at least one of a keypad, a dome switch, a touch pad, a jog wheel, or a jog switch, etc., but is not limited thereto.

Also, the user inputter 1080 may be an element of the control device 101, or an element of the image and audio processing apparatus 1000. The user inputter 1080 may include a function of obtaining the user input transferred from the control device 101.

The block diagrams of the image and audio processing apparatuses 100, 700, and 1000 shown in FIGS. 2, 7, and 10 are for an embodiment. Each component in the block diagram may be combined, added, or omitted according to specification of the image and audio processing apparatus 100, 700, or 1000 that is actively implemented. For example, if necessary, two or more components may be combined as one or one component may be divided as two or more components. Also, functions for each block are to explain the embodiment and each specific operation or device do not limit the scope of the disclosure.

As described above, according to one or more embodiments, when a user reproduces content, at least one of image quality and sound of the content may be automatically controlled taking into account at least one of the image signal and audio signal in units of scenes, and thus, visibility may be improved based on characteristics of the content and rendered sound may be provided to increase user's immersion in the content. Also, according to one or more embodiments, based on the result of analyzing each of the image signal and the audio signal when controlling the image signal and the audio signal, it is possible to faithfully provide the content intended by the manufacturer to the user. Also, according to one or more embodiments, a consistent visibility of the content may be provided based on peripheral illuminance. Also, according to one or more embodiments, a consistent visibility and sound of the content may be provided based on the peripheral environment.

The image and audio processing apparatus and the operating method thereof according to the embodiments may be implemented in the form of a computer-readable storage medium including computer-executable instructions, such as computer-executable program modules. The computer-readable storage medium may be any available medium that may be accessed by a computer, and includes volatile and non-volatile media and removable and non-removable media.

Also, the computer-readable storage medium may include both a computer storage medium and a communication medium. The computer storage medium may include volatile and non-volatile media and removable and non-removable media that are implemented using any method or technology for storing information, such as computer-readable instructions, a data structure, a program module, or other types of data. The communication medium typically includes computer-readable instructions, a data structure, a program module, or other data of modulated data signal such as carrier waves, or other transmission mechanisms, and includes an arbitrary information transfer medium.

In addition, the terms such as " . . . unit", etc. provided herein may be realized by a hardware component such as a processor or a circuit, and/or a software component executed by a hardware component such as a processor.

Also, the image and audio processing apparatus and the operating method thereof according to the embodiment may be implemented as a computer program product including a recording medium having a program stored therein, wherein the program for performing an operation of obtaining multiple language text, and operations of obtaining vector values respectively corresponding to words included in the multiple language text, converting the obtained vector values into vector values corresponding to target language, and obtaining target language text based on the converted vector values.

The above description is provided for the purpose of illustration, and it would be understood by those skilled in the art that various changes and modifications may be made without changing technical conception and essential features of the disclosure. Thus, the embodiments set forth herein or shown above are to be interpreted in an illustrative and non-limiting sense. For example, each component described to be of a single type can be implanted in a distributed manner. Likewise, components described to be distributed can be implanted in a combined manner.

The scope of the disclosure is defined by the following claims rather than by the detailed description of the embodiments. It shall be understood that all modifications and embodiments of the disclosure conceived from the meaning and scope of the claims and their equivalents are included in the scope of the disclosure.

What is claimed is:

1. An image and audio processing apparatus comprising:
    a display;
    an audio output interface;
    an illuminance sensor configured to obtain illuminance information with respect to surroundings of the image and audio processing apparatus;
    a memory storing one or more instructions; and
    a processor configured to execute the one or more instructions stored in the memory to:
        obtain characteristic information of an image signal of content based on analyzing an image signal of a scene included in the content,
        obtain characteristic information of an audio signal of the content based on analyzing an audio signal corresponding to the scene included in the content,
        control the display to dynamically display the image signal of the content based on the characteristic information of the image signal of the content and the characteristic information of the audio signal of the content,
        control the audio output interface to dynamically output the audio signal of the content based on the characteristic information of the image signal of the content and the characteristic information of the audio signal to output the audio signal of the content, and control a black equalizer function with respect to a dark area of the image signal of the content, based on a relationship between the illuminance information and a gain value of a black equalizer obtained according to the characteristic information of the image signal of the content and the characteristic information of the audio signal of the content.

2. The image and audio processing apparatus of claim 1, wherein the processor is further configured to execute the one or more instructions to:

control a contrast and color saturation function with respect to the image signal of the content, based on the characteristic information of the image signal of the content and the characteristic information of the audio signal of the content, and control at least one of an elevation perception generation and stage expansion function or a sound equalizer application function with respect to the audio signal of the content, based on the characteristic information of the image signal of the content and the characteristic information of the audio signal of the content.

3. The image and audio processing apparatus of claim 1, wherein the characteristic information of the image signal of the content comprises at least one of brightness information, color information, contrast information, or motion information of the image signal, and wherein the characteristic information of the audio signal of the content comprises at least one of location information of an audio object, voice information, music information, or sound effect information.

4. The image and audio processing apparatus of claim 1, wherein the processor is further configured to execute the one or more instructions to, when the image signal of the content is controlled based on the characteristic information of the image signal of the content and the characteristic information of the audio signal of the content, control at least one of brightness, contrast, or color saturation of the image signal of the content based on the illuminance information.

5. The image and audio processing apparatus of claim 1, wherein the processor is further configured to execute the one or more instructions to, based on a learning model that includes one or more neural networks, analyze the image signal and the audio signal of the scene included in the content, obtain the characteristic information of the image signal of the content and the characteristic information of the audio signal of the content, and control the display to dynamically display the image signal of the content and the audio output interface to dynamically output the audio signal of the content based on the characteristic information of the image signal of the content and the characteristic information of the audio signal of the content.

6. The image and audio processing apparatus of claim 1, wherein the processor is further configured to use a neural network to learn a pattern of recognizing the characteristic information of the image signal of the content and the characteristic information of the audio signal of the content and control the display to dynamically display the image signal of the content and the audio output interface to dynamically output the audio signal of the content based on the pattern.

7. An operating method of an image and audio processing apparatus, the operating method comprising:

analyzing, by the image and audio processing apparatus, an image signal of a scene included in content and obtaining characteristic information of an image signal of the content;

analyzing, by the image and audio processing apparatus, an audio signal corresponding to the scene included in the content and obtaining characteristic information of an audio signal of the content;

obtaining illuminance information with respect to surroundings of the image and audio processing apparatus;

controlling, by the image and audio processing apparatus, a display of the image and audio processing apparatus to dynamically display the image signal of the content based on the characteristic information of the image signal of the content and the characteristic information of the audio signal of the content;

controlling, by the image and audio processing apparatus, an audio output interface of the image and audio processing apparatus to dynamically output the audio signal of the content based on the characteristic information of the image signal of the content and the characteristic information of the audio signal of the content; and controlling, by the image and audio processing apparatus, a black equalizer function with respect to a dark area of the image signal of the content, based on a relationship between the illuminance information and a gain value of a black equalizer obtained according to the characteristic information of the image signal of the content and the characteristic information of the audio signal of the content.

8. The operating method of claim 7, further comprising:

controlling a contrast and color saturation function with respect to the image signal of the content based on the characteristic information of the image signal of the content and the characteristic information of the audio signal of the content; and controlling at least one of an elevation perception generation and stage expansion function or a sound equalizer application function with respect to the audio signal of the content based on the characteristic information of the image signal of the content and the characteristic information of the audio signal of the content.

9. The operating method of claim 7, wherein the characteristic information of the image signal of the content comprises at least one of brightness information, color information, contrast information, or motion information of the image signal, and the characteristic information of the audio signal of the content comprises at least one of location information of an audio object, voice information, music information, or sound effect information.

10. The operating method of claim 7, when controlling the image signal of the content based on the characteristic information of the image signal of the content and the characteristic information of the audio signal of the content, controlling at least one of brightness, contrast, or color saturation of the image signal of the content based on the illuminance information with respect to the surroundings of the image and audio processing apparatus.

11. The operating method of claim 7, further comprising:

using a neural network to learn a pattern of recognizing the characteristic information of the image signal of the content and the characteristic information of the audio signal of the content and control the display to dynamically display the image signal of the content and the audio output interface to dynamically output the audio signal of the content based on the pattern.

12. A non-transitory computer-readable recording medium comprising instructions for execution by a processor of an image and audio processing apparatus to cause the image and audio processing apparatus to perform operations comprising:

analyzing an image signal of a scene included in content and obtaining characteristic information of an image signal of the content;

analyzing an audio signal corresponding to the scene included in the content and obtaining characteristic information of an audio signal of the content;

obtaining illuminance information with respect to surroundings of the image and audio processing apparatus;

controlling a display of the image and audio processing apparatus to dynamically display the image signal of the content based on the characteristic information of the image signal of the content and the characteristic information of the audio signal of the content;

controlling an audio output interface of the image and audio processing apparatus to dynamically output the audio signal of the content based on the characteristic information of the image signal of the content and the characteristic information of the audio signal of the content; and controlling, by the image and audio processing apparatus, a black equalizer function with respect to a dark area of the image signal of the content, based on a relationship between the illuminance information and a gain value of a black equalizer obtained according to the characteristic information of the image signal of the content and the characteristic information of the audio signal of the content.

* * * * *